United States Patent [19]

Speiser

[11] Patent Number: 5,011,387
[45] Date of Patent: Apr. 30, 1991

[54] ROTARY PISTON INTERNAL COMBUSTION ENGINE

[75] Inventor: Josef Speiser, Wasserburg, Fed. Rep. of Germany

[73] Assignee: Wankel GmbH, Berlin, Fed. Rep. of Germany

[21] Appl. No.: 420,053

[22] Filed: Oct. 11, 1989

[30] Foreign Application Priority Data

Oct. 11, 1988 [DE] Fed. Rep. of Germany ... 8812757[U]

[51] Int. Cl.⁵ .............................................. F01C 21/04
[52] U.S. Cl. ...................................................... 418/94
[58] Field of Search ........................... 418/61.2, 91, 94

[56] References Cited

U.S. PATENT DOCUMENTS

| | | | |
|---|---|---|---|
| 3,176,916 | 4/1965 | Sollinger | 418/91 X |
| 3,180,323 | 4/1965 | Paschke | 418/94 X |
| 3,269,370 | 8/1966 | Paschke et al. | 418/94 X |
| 3,373,722 | 3/1968 | Zimmermann et al. | 418/94 X |
| 3,771,903 | 11/1973 | King et al. | 418/94 X |
| 4,801,254 | 1/1989 | Eiermann . | |
| 4,830,591 | 5/1989 | Eiermann et al. | 418/94 X |

Primary Examiner—Michael Koczo
Attorney, Agent, or Firm—Robert W. Becker & Associates

[57] ABSTRACT

A rotary piston internal combustion engine of trochoidal type of construction with dual-arc or curved mantle runway or inner surface and at least one triangular piston having corners thereof in continuous sliding engagement with the inner runway or surface, such piston being journalled by roller bearings and regulated or controlled by a synchronization gear transmission. An oil-collector groove, channel or trough is provided on the shaft on a side remote from the or synchronization gear transmission. Bores in the eccentric lead from the oil-collector groove, channel or trough to the bearing of the piston and the smallest or most nominal oil quantities or volume for lubrication of such bearings, for lubrication of the synchronization gear transmission as well as the sealing parts of the piston, are provided extending in the eccentric.

7 Claims, 2 Drawing Sheets

ROTARY PISTON INTERNAL COMBUSTION ENGINE

BACKGROUND OF THE INVENTION

1. Field of the Invention

The present invention relates to a rotary piston internal combustion engine of trochoidal type of construction, of which the housing or casing consists of side parts and at least one shell, casing or mantle part having respectively a dual-arc or curved inner surface or mantle runway. The housing has an shaft with at least one eccentric per inner surface or mantle runway journalled to pass through the housing. A triangular piston means having corners thereof in sliding engagement along the pertaining inner surface or mantle runway is journalled upon a roller bearing as to the eccentric. The triangular piston means rotates as controlled or regulated by a synchronous gear transmission arranged between a side wall of one of the side parts and the eccentric.

2. Description of the Prior Art

A piston of such an engine provided for higher loading is cooled conventionally with oil which enters via axial and radial bores in the shaft and the eccentric into the bearing space and transmission space and drains into an oil sump. Under these circumstances the oil must be kept away from the working chambers of the engine via oil inner seals located in the side walls of the piston. Because of the space requirement thereof, constructive difficulties resulted to accommodate and install such seals, and additionally, it is hardly possible, with such oil seals to preclude completely the passage of the oil into the working chambers or spaces and to prevent a worsening of the exhaust gas or discharge values of the engine as caused by such oil seal problems.

German Offenlegungsschrift 35 45 818 and a corresponding U.S. Pat. No. 4,801,254-Eiermann dated Jan. 31, 1989 belonging to the assignee of the present invention and based thereon describes an engine of the aforementioned type having roller bearings between the piston and eccentric with which the lubrication can be limited or restricted to a minimum quantity or volume of oil of which excesses now only need to be adequate or sufficient for lubrication of the synchronization gear transmission and the sealing elements of the piston. Special oil inner seals in the piston side walls can be eliminated accordingly.

According to the disclosure of German Patent 35 45 818 and U.S. Pat. No. 4,801,254-Eiermann correspondingly there was proposed to supply the oil tot he eccentric bearing from outside to a side of the synchronous gear transmission. With certain types of construction, however, this is not possible and consequently the oil or lubricant must be supplied from the other side of the eccentric remote or away from the transmission.

SUMMARY OF THE INVENTION

An object of the present invention accordingly is to provide an arrangement of oil supply upon a side of the eccentric away or remote from the transmission in a manner or arrangement readily produced externally of the hollow inner spaces or chambers of the shaft and of the eccentric means, especially with the arrangement of a hollow shaft in the wall material of the shaft respectively of the eccentric means in a minimum or minimal dosage necessary only for the bearing or transmission and sealing elements of the piston means.

A special advantage of the present inventive arrangement is that for, engines with two mantle runways or inner surface and piston means the eccentric bearing on both sides can be supplied with oil from a single oil supply via the intermediate or center part of the housing or shell.

BRIEF DESCRIPTION OF THE DRAWINGS

This object, and other objects and advantages of the present invention, will appear more clearly from the following specification in conjunction with the accompanying drawings which illustrate two sample embodiments of features in accordance with the present invention.

DESCRIPTION OF PREFERRED EMBODIMENTS

Figure 1:
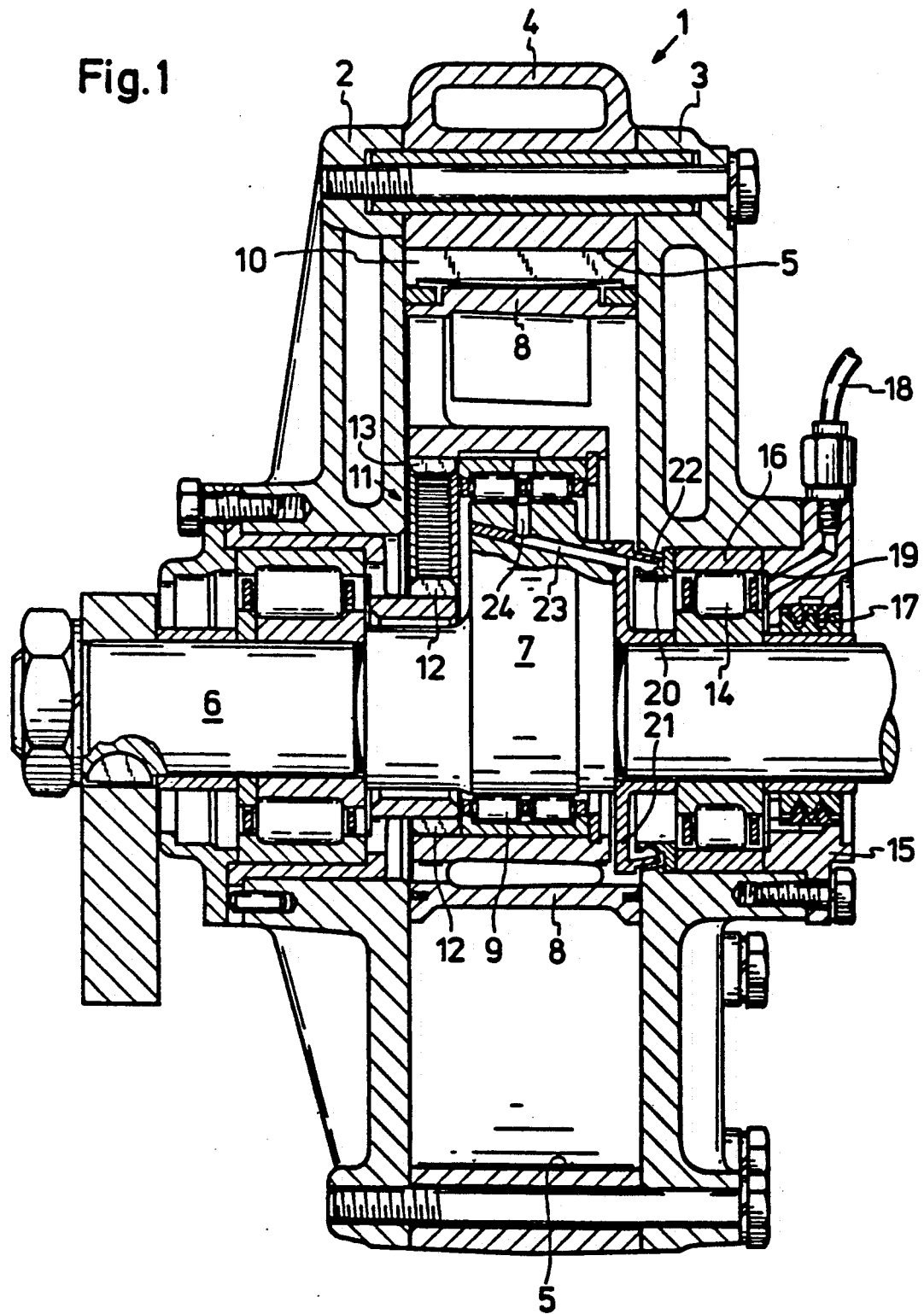
FIG. 1 is a view that shows an axial section through a rotary piston internal combustion engine having a mantle part or housing and a rotary piston means therein with features in accordance with the present invention.

Referring now to the drawings in detail, the rotary piston internal combustion engine illustrated in FIG. 1 has a housing 1 formed of a left side part 2 and a right side part 3 and a mantle part, casing or housing 4 screwed in position between these side parts and having a dual-arc or curved trochoidal-shaped mantle runway or inner surface 5. A shaft 6 passes axially through the housing or casing 1 and a triangular piston 8 is rotatably mounted upon a roller bearing 9 to rotate upon an eccentric 7 of the shaft 6. The piston 8 glides in a planetary movement with sealing strips 10 provided in corners of the piston 8 and having continuous engagement along the inner surface or mantle runway 5. A synchronization gear transmission 11 is arranged between the left side part 2 and the piston 8. The synchronization transmission consists of a gear or pinion 12 located stationary or fixed in the side part 2 around the shaft 6 and a hollow gear 13 is arranged rigidly or secure on the piston 8.

The bearing means 14, a roller bearing, of the shaft 6 as illustrated to the right in the drawing illustration is closed-off by an annular or ring-shaped cover 15 upon an axially outer side thereof and this cover 15 engages against an outer shell or raceway 16 of the bearing 14. The cover 15 is sealed-off with a labyrinth seal 17 with respect to the shaft 6. An oil supply line 18 is provided in the side parts 3 and this oil supply line 18 opens into a space or chamber 19 between the rollers of the bearing 14 and the cover 15.

An annular or ring-shaped oil supply spout or nozzle 20 is provided around the shaft 6 on the right side of the outer shell or raceway 16 of the bearing 14 as shown in the drawing illustration. A circular or generally U-shaped oil-collector groove 21 with its base rigidly connected with the eccentric 7 surrounds with its inner leg the shaft 6 and with its outer slightly inwardly bent leg 22 surrounds the nozzle 20 with a small spacing. The collector 21 is rigidly and securely connected with the eccentric and rotates with the shaft, while the nozzle 20 is rigidly and securely connected with the housing side wall 3 via the bearing shell or housing 16 and consequently fixed or stationary. A slanted or inclined bore 23 leads from this oil-collector groove channel or trough 21 in the eccentricity maximum location of the eccentric 7 into a radial bore 24 which ends or terminates in the roller bearing 9 of the eccentric 7.

The unused or unconsumed oil flowing into the bearing 14 from the oil supply line 18 can discharge only into the oil-conveying spout or nozzle 20. The oil dripping off along the edge thereof drops into the oil-collector groove, channel or trough 21 and is collected by the centrifugal force effect or centrifuging in the radially outermost edge of the channel, groove or trough 21 and then the oil is pressed via the bores 23 and 24 into the roller bearing 9 of the eccentric 7. The oil discharging laterally in small or nominal quantities or volume from this roller bearing 9 serves for lubrication of the synchronization gear transmission 11 and the sealing parts 10 as well as the not illustrated axial seal means of the piston 8. Via a corresponding dosage of the oil only so great a quantity or volume of oil comes or reaches into the roller bearing 9 that the synchronization gear transmission 11 and the sealing parts of the piston are still lubricated, but no oil or only a negligible quantity of oil reaches the working or operating chambers of the engine so that inner oil seals can be eliminated.

Figure 2:
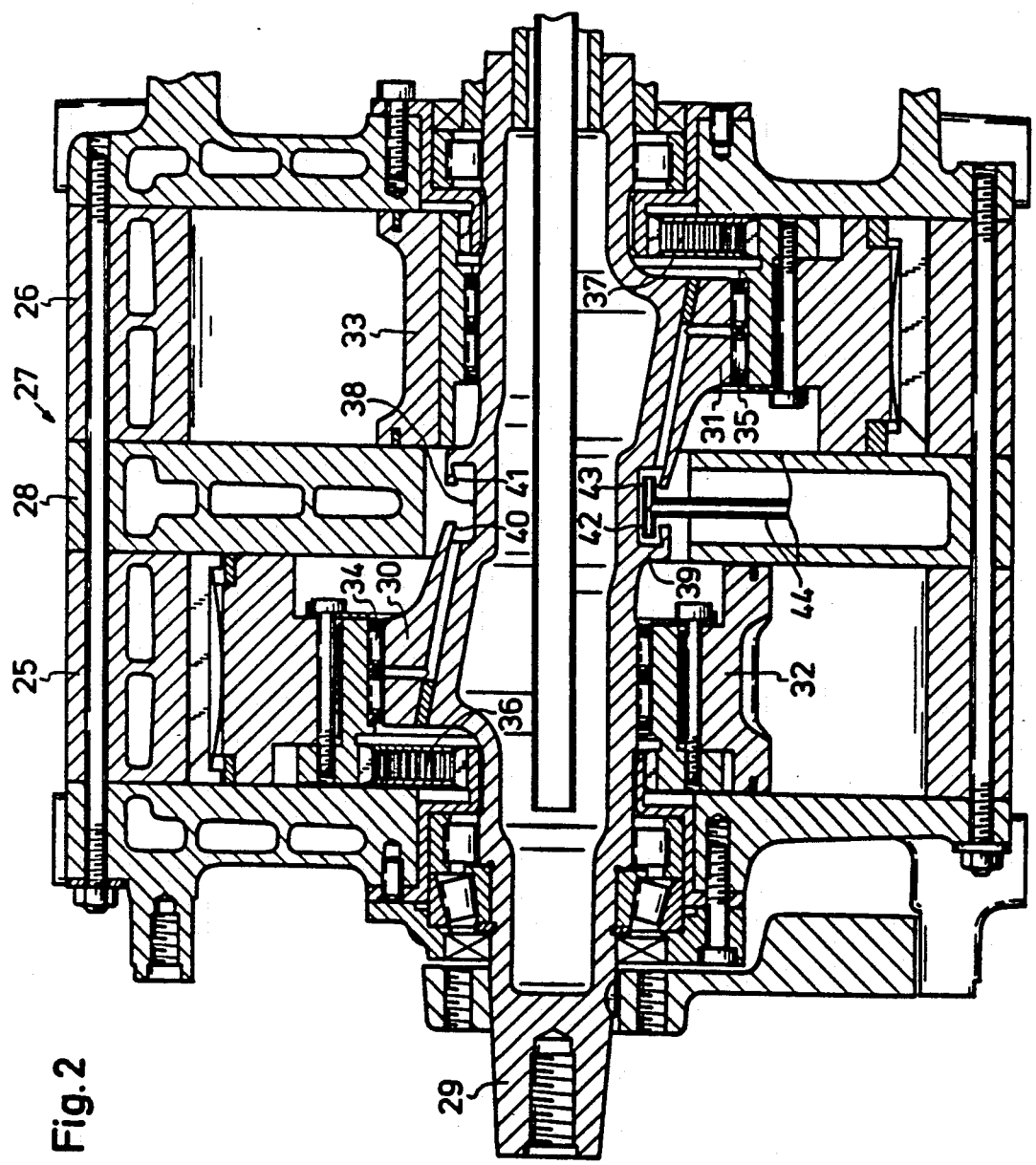
FIG. 2 is a view that shows an axial section through a rotary piston internal combustion engine having two mantle parts or housing inner surfaces and two rotary piston means with features in accordance with the present invention.

Referring now to FIG. 2 of the drawings, the internal combustion engine of the rotary piston type illustrated in FIG. 2 represents a doubling of the features illustrated in FIG. 1 with two mantle or casing parts 25, 26 of the housing 27 like the mantle or casing part 4 in FIG. 1 and between which an intermediate casing or body part 28 is arranged which corresponds in function as to the side parts 2 and 3 forming the working chambers of the rotary piston engine. The shaft 29 passing or extending through the housing 27 has two eccentrics 30, 31 upon which the pistons 32 and 33 rotate inside the mantle or casing parts 25, 26 and such pistons 32 and 33 are like the piston 8 in FIG. 1. Accordingly, the bores 23 and 24 are provided in the eccentrics and via these bores the oil is conveyed into the roller bearing means 34, 35 of the eccentric means 30, 31. Synchronization gear transmission means 36 and 37 are arranged at the axially outer sides of the means 30, 31 and these synchromesh or transmission gear means 36 and 37 likewise are supplied with the required minimum oil quantity or volume like the sealing elements of the pistons 32, 33 via the roller bearings 34 and 35.

The oil-collector groove, channel or trough 38 corresponding to the oil-collector groove, channel or trough 21 in FIG. 1 is provided in common for both piston means 32, 33 particularly in the middle of the angulated, off-set or cropped intermediate piece or element 39 of the shaft 29 in the form of a recess, bore or groove. This oil-collector groove 38 has undercut edges 40, 41 forming the circulating groove, channel or trough means which have a transition into branches 42, 43 constructed T-shaped directed laterally in the axial direction for an oil supply tube or conduit 44. This oil supply tube or conduit 44 is located in the middle part or element 28 and is supplied via a non-illustrated oil supply line for dosing herewith. These branches 42 43 of an oil supply tube or line 44 correspond to the oil supply spout or nozzle 20 of the rotary piston engine illustrated in FIG. 1. The slanted or inclined bores 23 open below or underneath the undercut edges 40, 41 of the oil-collector groove, channel or trough 38 and the oil collected therein is pressed below the edges 40, 41 via the centrifugal force effect for centrifuging. In place of a T-shaped extending oil supply tube or conduit 44 there is noted that also two tubes or pipes bent L-shaped in an axial plane can be provided.

It is required or necessary for a uniform supplying of the roller bearings 9, 34, 35 with oil or lubricant that the radial bore 24 opens into the middle of this eccentric bearing means. It is purposeful and expedient that the rollers of this bearing are divided in the middle, so that the opening of the radial bore 24 is not traversed or covered by the rollers. With that there is avoided that the oil carbon or rub-off due to scour or wear is rolled into this opening and such opening consequently would be blocked or plugged which could lead to destruction of the rotary piston internal combustion engine.

The rotary piston internal combustion engine of trochoidal type of construction is provided with dual-arc or curved inner surface or a mantle runway 5 and at least one triangular piston means 8, 32, 33 roller-bearing journalled for rotation having corners of the piston means in continuous sliding engagement with the mantle runway or inner surface 5. An oil-collector groove, channel or trough 21, 38 is provided on a side remote from the synchronization gear transmission 11, 36, 37 which controls or regulates the piston means. Bores 23, 24 in the eccentric means 7, 30, 31 lead from the oil-collector groove, channel or trough 21, 38 to the bearing means 9, 34, 35 of the triangular piston means 8, 32, 33; and moreover the smallest or most nominal oil quantities or volume for lubrication of these bearing means 9, 34, 35, for lubrication of the synchronization gear transmission means 11, 36, 37 as well as the sealing parts of the piston means 8, 32, 33, are guided and conveyed via these bores 23, 24.

The rotary piston internal combustion engine has a trochoidal type of construction and consists of a housing 1, 27 having side parts 2, 3 and at least one mantle part or casing 4, 25, 26 with respectively dual-arc or curved inner surface or casing runway 5. The housing 1, 27 has an shaft 6, 29 with at least one eccentric 7, 30, 31 per mantle runway or inner surface 5 and this shaft passes axially through the housing between the side parts 2, 3. A triangular piston means 8, 32, 33 journalled upon roller bearings 9, 34, 35 on the eccentric 7, 30, 31 has corners of the piston means in sliding engagement along the pertaining inner surface or mantle runway 5. The triangular piston means rotates as regulated or controlled by a synchronization gear transmission 11, 36, 37 arranged between a side wall of a side part 2, 3 and the eccentric 7, 30, 31.

An oil-collector groove, channel or trough 21, 38 is arranged concentrically around the shaft 6, 29 on a side of the eccentric means 7, 30, 31 remote from the synchronization gear transmission 11, 36, 37. A bore 23 leads inclined radially outwardly at a location of the eccentricity maximum of the eccentric means 7, 30, 31 and this bore 23 opens into a radial bore 24 ending or terminating in the middle of the roller bearing 9, 34, 35 of the eccentric means 7, 30, 31. Additional devices or features including an oil-guiding spout or nozzle 20, T-shaped branches 42, 43 and oil supply tubes or conduits 44 arranged stationary on the housing 1, 27 of the internal combustion engine are provided for conveying or forwarding of dosed lubricating oil into the oil-collector groove, channel or trough 21, 38.

The oil-collector groove, channel or trough 21 is secured as a part concentric to the shaft 6 on a side of the eccentric 7 remote or away from the synchronization gear transmission means 11. Moreover there is also provided an oil-conveying spout or nozzle 20 arranged stationary and concentrically as to the shaft 6 in a location on the outer shell or raceway 16 of a bearing 14 of the shaft 6 provided in the side part 3 and closed-off at an axially outer side thereof via a cover or end plate 15 remote from the synchronization gear transmission 11. An oil supply line or conduit 18 leads from the side part 3 into the bearing 14.

In the embodiment including an arrangement of two mantle parts or inner runways 25, 26 and two triangular pistons 32, 33, the oil-collector groove, channel or trough 38 is a recess, bore or groove in the shaft 29 in the middle thereof between the eccentrics 30, 31 and this oil-collector groove, channel or trough 38 has laterally undercut edges 40, 41 from which radial bores 24 lead at a location of the eccentricity maximum of the eccentric 30, 31 into inclined or slanted radially outwardly extending bores 23, which bores open into the middle of the roller bearing means 34, 35 of the eccentric means 30, 31.

At least one oil supply pipe or tube 44 from the middle part 28 of the housing 27 of the internal combustion engine projects under the edges 40, 41 of the oil supply trough. The oil supply tube, line or conduit 44 terminates in T-shaped branches 42, 43 located in an axial plane and these branches extend below or under the edges 40, 41 of the oil-collector groove, channel or trough 38.

Two oil supply tubes or conduits 44 are provided of which ends bent-off L-shaped located in an axial plane extend below or under the edges 40, 41 of the oil-collector groove, channel or trough 38.

The rollers of the roller bearings 9, 34, 35 of the eccentric means 7, 30, 31 are divided and do not traverse or travel over the opening of the radial bores 24 in the eccentric means 7, 30, 31.

The present invention is, of course, in no way restricted to the specific disclosure of the specification and drawings, but also encompasses any modifications within the scope of the appended claims.

What I claim is:

1. A rotary piston internal combustion engine of trochoidal type of construction of which a housing consists of side parts and at least one mantle part with respectively dual-arc mantle runway inner surface, said housing having a shaft extending therein with at least one eccentric means per mantle runway inner surface in the housing with the shaft passing through the eccentric means, as well as including eccentric bearing means with roller bearings and including a triangular piston means journalled upon roller bearings of the eccentric bearing means and having piston corners thereof in sliding engagement along the pertaining mantle runway inner surface, and including a gear transmission means that controls and regulates rotation of the piston means and that is arranged between a side wall of one side part and the eccentric means, the improvement therewith comprising:
   an oil-collector groove means as an oil-collector through arranged concentrically around the shaft on a side of the eccentric means remote from the gear transmission means;
   a bore means provided at the location of the eccentricity maximum of the eccentric means extending at an incline radially outwardly into that oil-collector groove means;
   a radial bore means terminating in the middle of the roller bearing of the eccentric bearing means and into which the inclined bore means opens; and
   means provided stationary on the housing of the rotary piston internal combustion engine for conveying all of dosed lubricating oil to the eccentric bearing means and via the oil-collector trough extending in a full circle around the shaft.

2. A rotary piston internal combustion engine of trochoidal type of construction of which a housing consists of side parts and at least one mantle part with respectively dual-arc mantle runway inner surface, said housing having a shaft extending through the housing with at least one eccentric means per mantle runway inner surface in the housing with the shaft passing through the eccentric means, as well as including eccentric bearing means with roller bearings and including a triangular piston means journalled upon roller bearings of the eccentric bearing means and having piston corners thereof in sliding engagement along the pertaining mantle runway inner surface, and including gear transmission means that controls and regulates rotation of the piston means and that is arranged between a side wall of one side part and the eccentric means, the improvement therewith comprising:
   an oil-collector groove means as an oil-collector trough arranged concentrically around the shaft on a side of the eccentric means remote from the gear transmission means;
   a bore means provided at the location of the eccentricity maximum of the eccentric means extending at an incline radially outwardly into that oil-collector groove means;
   a radial bore means terminating in the middle of the roller bearing of the eccentric bearing means and into which the inclined bore means opens; and
   means provided stationary on the housing of the rotary piston internal combustion engine for conveying of dosed lubricating oil to the oil-collector trough, said oil-collector trough being a part concentric to the shaft secured to a side of the eccentric means remote from the gear transmission means; and oil supply nozzle means arranged stationary concentric to the shaft as provided in an outer shell raceway in a side part of a bearing of the shaft closed off at an axially outer side thereof by a cover remote from the gear transmission means; and an oil supply line leading from the side part into said bearing.

3. A rotary piston internal combustion engine according to claim 1, which includes an arrangement of two mantle parts as dual inner surfaces within a housing and including two triangular pistons with the oil-collector trough being a groove in the shaft in a middle thereof between the eccentrics and having laterally undercut edges from which bore means at the eccentricity maximum of the eccentric lead at an incline radially outward into bores extending radially which open in the middle of the roller bearing means of the eccentric; and
   at least one oil supply tube means projecting below the edges of the oil supply trough and extending from the middle part of said housing of the internal combustion engine.

4. A rotary piston internal combustion engine according to claim 3, in which said oil supply tube means terminates in T-shaped branches located in an axial plane, which branches extend below the edges of the oil-collector trough.

5. A rotary piston internal combustion engine according to claim 3, in which two oil supply tube means are provided having bent-off L-shaped ends located in an axial plane and extending below the edges of the oil-collector trough.

6. A rotary piston internal combustion engine according to claim 3, in which rollers of the roller bearing means of the eccentric are divided and do not traverse to pass over the opening of the radial bores in the eccentric.

7. A rotary piston internal combustion engine of trochoidal type of construction of which a housing consists of side parts and at least one mantle part with respectively dual-arc mantle runway inner surface, said housing having a shaft extending through the housing with at least one eccentric means per mantle runway inner surface in the housing with the shaft passing through the eccentric means, as well as including eccentric bearing means with roller bearings and including a triangular piston means journalled upon the roller bearings of the eccentric bearing means and having piston corners thereof in sliding engagement along the pertaining mantle runway inner surface, and including a gear transmission that controls and regulates rotation of the piston means and that is arranged between a sidewall of one side part and the eccentric means, the improvement therewith comprising:

an oil-collector groove means closed radially outwardly rotating with the shaft on a side of the eccentric means remote from the gear transmission; an oil supply means stationary in the housing and opening into the oil-collector groove means extending in a full circle around the shaft; and bore means in the eccentric extending from the oil supply means so that all oil lubricant is dosed exclusively into the center of the eccentric bearing means therewith.

* * * * *